United States Patent
Chu et al.

(10) Patent No.: US 9,195,595 B2
(45) Date of Patent: Nov. 24, 2015

(54) PORTABLE APPARATUS USING MULTI-CORE STORAGE MECHANISM AND DATA ACCESS METHOD THEREFOR

(71) Applicant: HTC Corporation, Taoyuan (TW)

(72) Inventors: Shih-Hung Chu, Taoyuan (TW); Yu-Hsin Liang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 239 days.

(21) Appl. No.: 13/848,518

(22) Filed: Mar. 21, 2013

(65) Prior Publication Data

US 2014/0289484 A1   Sep. 25, 2014

(51) Int. Cl.
*G06F 12/00* (2006.01)
*G06F 12/06* (2006.01)

(52) U.S. Cl.
CPC .......... *G06F 12/06* (2013.01); *G06F 2212/254* (2013.01)

(58) Field of Classification Search
CPC ............................ G06F 12/06; G06F 2212/254
USPC ........................................................ 711/117
See application file for complete search history.

(56) References Cited

U.S. PATENT DOCUMENTS

| 2005/0289317 A1* | 12/2005 | Liou et al. ..................... 711/170 |
| 2009/0228662 A1* | 9/2009 | Chang et al. ................... 711/148 |
| 2010/0036997 A1 | 2/2010 | Brewer et al. |

FOREIGN PATENT DOCUMENTS

TW    I379311    12/2012

OTHER PUBLICATIONS

Taiwanese Office Action dated Feb. 13, 2015.

* cited by examiner

*Primary Examiner* — Yong Choe
(74) *Attorney, Agent, or Firm* — Rabin & Berdo, P.C.

(57) ABSTRACT

Portable apparatus using multi-core storage mechanism and data access method therefor are provided. The portable apparatus includes a host circuit for controlling the portable apparatus, having a plurality of channels for being coupled to a multi-core storage unit so as to perform write or read operation. The host circuit divides data to be written into a plurality of groups of block data and the host circuit outputs the groups of block data through at least two channels of the plurality of channels separately so as to write the data blocks into the multi-core storage unit.

16 Claims, 4 Drawing Sheets

PORTABLE APPARATUS USING MULTI-CORE STORAGE MECHANISM AND DATA ACCESS METHOD THEREFOR

BACKGROUND

1. Technical Field

The disclosure relates to a portable apparatus with using multi-core storage mechanism and a data access method therefor.

2. Description of the Related Art

Nowadays, electronic devices such as smart phones and tablet computers are equipped with versatile functionality, and the users frequently download and update application programs from the software market, leading to rapid data access. In addition, since the smart phones and tablet computers are intended for providing good user experience, the manufacturers employ various approaches, such as utilizing processors with higher operating frequencies or multiple cores to speed up the execution of the application programs, so as to make the users experience the smoothness of use, enhancing the productivity of the electronic devices.

SUMMARY

Embodiments of a portable apparatus with using multi-core storage mechanism and a data access method therefor are provided.

An embodiment of the disclosure provides a portable apparatus with using multi-core storage mechanism. The portable apparatus includes a host circuit for controlling the portable apparatus, having a plurality of channels for being coupled to a multi-core storage unit so as to perform write or read operation. The host circuit divides data to be written into a plurality of groups of block data and the host circuit outputs the groups of block data through at least two channels of the plurality of channels separately so as to write the data blocks into the multi-core storage unit.

According to another embodiment, a data access method for use in a portable apparatus with using multi-core storage mechanism includes the following steps. The method includes: (a) dividing data to be written into a plurality of groups of block data by the host circuit; and (b) outputting the plurality of groups of block data to the multi-core storage unit through at least two channels of the plurality of channels individually so as to write the plurality of groups of block data into at least two storage devices of the multi-core storage unit.

According to another embodiment, a computer readable storage medium is provided, having stored therein program code of one or more program modules, which when executed by a portable device, causes the portable device to perform the above data access method.

The above and other aspects of the disclosure will become better understood with regard to the following detailed description. The following description with multiple embodiments is made with reference to the accompanying drawings.

DETAILED DESCRIPTION

Figure 1:
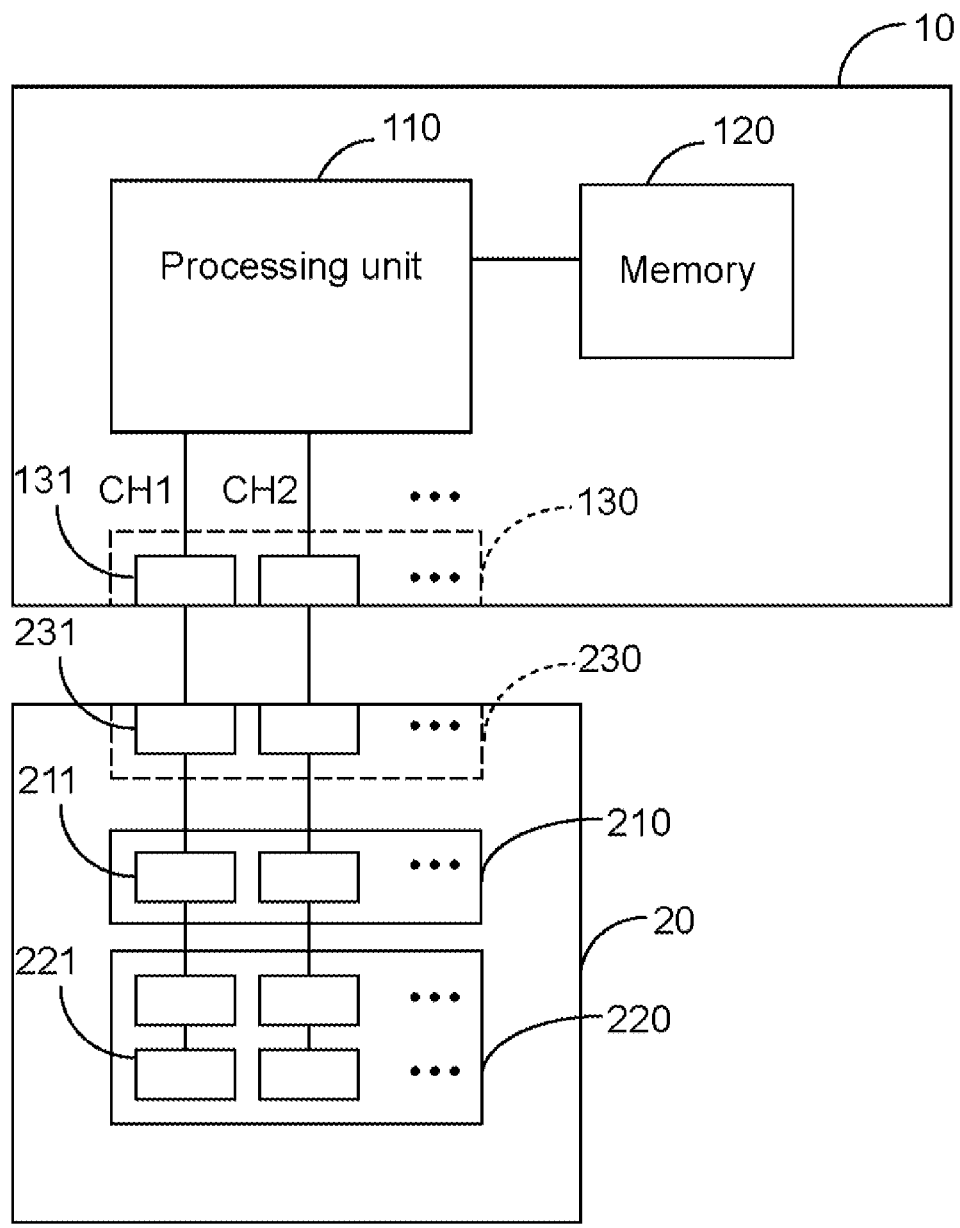
FIG. 1 is a block diagram of an embodiment of a portable apparatus with using multi-core storage mechanism.

Referring to FIG. 1, a block diagram of an embodiment of a portable apparatus with using multi-core storage mechanism is provided. The portable apparatus 1 includes a host circuit 10 for controlling the portable apparatus and the host circuit 10 includes a plurality of channels such as CH1, CH2 to couple a multi-core storage unit 20 to perform data write or read operation. The portable apparatus 1 can be implemented as various electronic devices, such as smart phones, tablet computers, wearable devices, multimedia players, navigation devices, electronic books, personal digital assistants and so on. The portable apparatus 1 can be realized by using other devices or components or architecture, such communication modules, touch panels, or video or audio processing unit, and so on.

Figure 2:
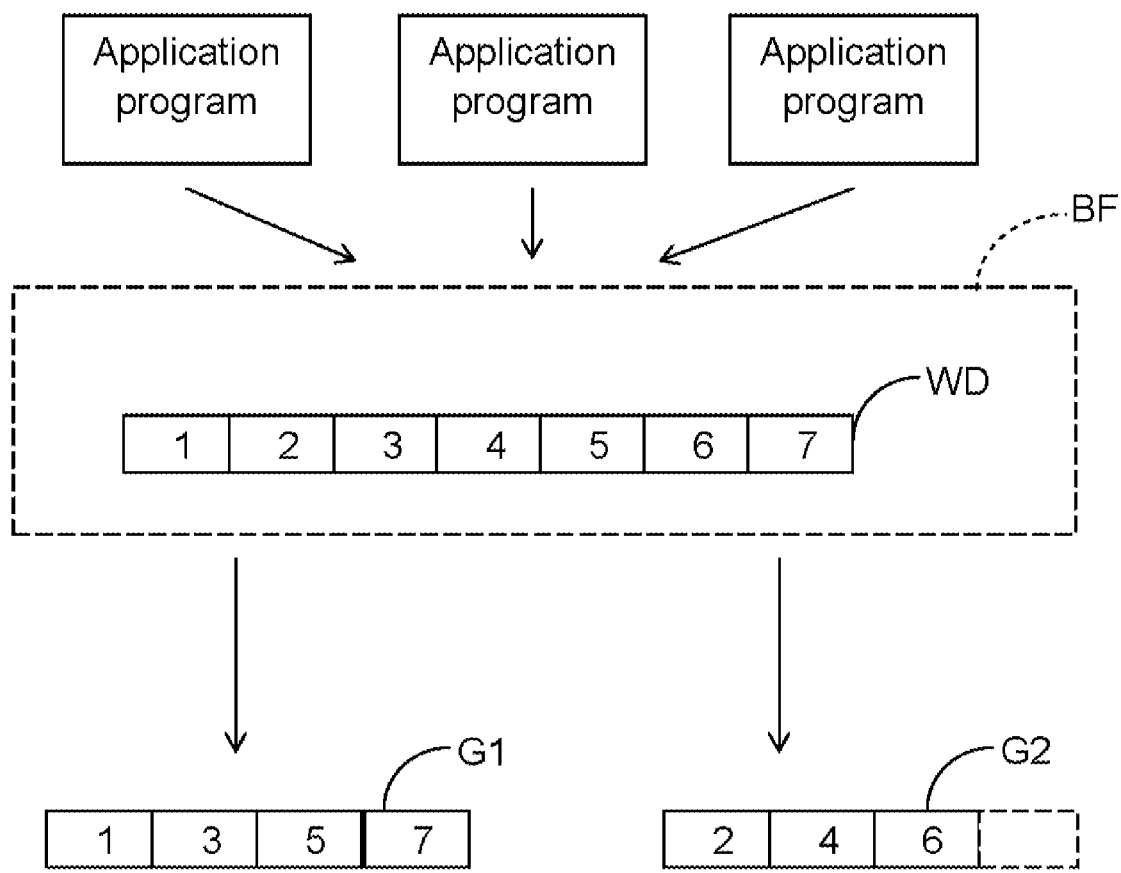
FIG. 2 is a diagram illustrating a host circuit of the portable apparatus of FIG. 1 executing an embodiment of a data access method.

As illustrated in FIG. 2, a host circuit of the portable apparatus of FIG. 1 executes an embodiment of a data access method. The host circuit 10 divides data to be written into a plurality of data block (e.g. G1, G2). The host circuit 10 outputs the groups of block data to a multi-core storage unit 20 through at least two channels of the plurality of channels individually so as to write the plurality of groups of block data into the multi-core storage unit 20.

In FIG. 2, the host circuit 10, for example, receives write operation(s) from one or more programs or threads; in a buffer memory region BF, the data to be written, denoted as WD, may include write data corresponding to the write operation(s) in terms of block, for example, blocks 1, 2-7 of the data to be written WD.

In some embodiments, the host circuit 10 divides the data to be written into the plurality of groups of block data alternately in terms of block. The data to be written WD can be divided in various manners. For example, blocks 1, 3, 5, 7 are taken as a first group of block data G1 and blocks 2, 4, 6 are taken as a second group of block data G2. As an example, the host circuit 10 outputs the first group of block data G1 to the multi-core storage unit 20 through a channel CH1 and the second group of block data G2 to the multi-core storage unit 20 through a channel CH2. As another example of alternately dividing the data to be written WD, such as blocks 1, 2, 5, 6 are taken as a first group of block data G1, and blocks 3, 4, 7 are taken as a second group of block data G2. For example, blocks 1, 5; 2, 6; 3, 7; 4 are taken as four groups of block data, which are outputted by using four channels. As such, the division can be performed similarly, according to the number of channels and requirements.

In the course of outputting the plurality of groups of block data individually through the channels (such as two channels CH1, CH2) to the multi-core storage unit 20, at least two channels are utilized for transferring different group of block data simultaneously in the entire or nearly entire period of time, whereby the data access performance of the portable apparatus 1 can be improved.

In an embodiment, the host circuit of FIG. 1 includes: a processing unit 110, a memory 120, and a host data interface unit 130. The processing unit, coupled to the host data interface unit 130 and the memory 120, is for controlling the portable apparatus to perform the data access method as exemplified in FIG. 2 above.

In an embodiment, the multi-core storage unit includes: a controller 210 and a plurality of storage devices 220. The controller 210 includes a plurality of management modules, each of the management modules coupled to a corresponding one of the channels; for example, a management module 211 corresponds to channel CH1. The plurality of storage devices 220, for example, can be implemented as non-volatile memory dies, or each storage device corresponds to one or more memory dies. Each of the storage devices is coupled to a corresponding one of the management modules; for example, the management module 211 corresponds to a storage device 221, wherein the controller 210 performs data write or read operation on the storage devices 220. The host circuit 10 writes the plurality of groups of block data into at least two storage devices of the plurality of storage devices 220.

In another embodiment, the multi-core storage unit further includes: a client data interface unit 230, for being coupled to the channels. The controller 210 is coupled to the channels through the client data interface unit 230; each the management modules is coupled to a corresponding one of the channels through the client data interface unit 230; for example, the management module 211 corresponds to the channel CH1. The client data interface unit 230, for example, includes a plurality of data interfaces corresponding to the channels; for example, a data interface 231 corresponds to the channel CH1 and is coupled to a data interface 131 of the host data interface unit 130 corresponding to the channel CH1.

Hence, in some embodiments, the multi-core storage unit can be realized as a removable memory module or memory card, for use by the portable apparatus 1.

Besides, in some embodiments, the multi-core storage unit can be realized as a built-in memory unit of the portable apparatus 1. In these embodiments, the host data interface unit 130 and/or the client data interface unit 230 can be employed, removed, or replaced by other data transfer or interface circuit; the implementation is not limited to the embodiment of FIG. 1.

Figure 3:
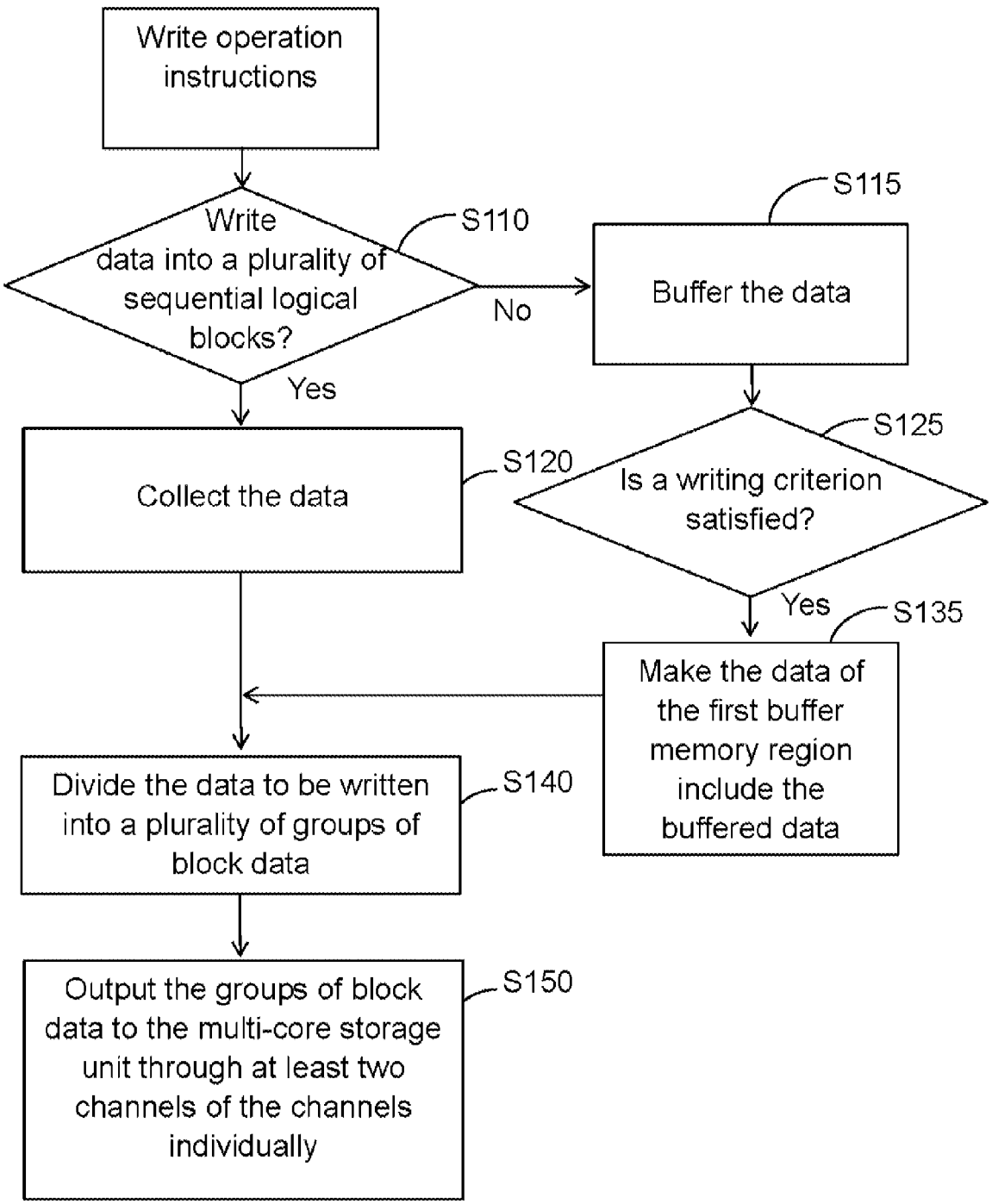
FIG. 3 is a flowchart of an embodiment of a data access method.

FIG. 3 is a flowchart of an embodiment of a data access method. The method can be realized by each embodiment of the above portable apparatus 1.

As indicated in step S110, the host circuit 10 determines whether the portable apparatus 1 is to write data into a plurality of sequential logical blocks. If so, the host circuit 10 collects the data, as indicated in step S120. For example, the collected data is stored in a first buffer memory region, wherein the first buffer memory region (e.g., the buffer memory region BF) is, for example, in the memory 120 of the host circuit 10 or in a built-in memory of the processing unit 100, the implementation of which is not limited to this.

As indicated in step S115, if the host circuit 10 determines that the portable apparatus is to write data into non-sequential logical blocks, the host circuit 10 buffers the data; for example, the data is stored in a second buffer memory region. In step S125, the host circuit 10 determines whether a writing criterion is satisfied. If the writing criterion is satisfied, then as shown in step S135, the host circuit 10 puts buffered data in the second buffer memory to the first buffer memory region so as to make the data of the first buffer memory region include the buffered data (e.g., the buffered data after several times of accumulation).

The data of the first buffer memory region is called the "data to be written". While different write operations of the portable apparatus happen, the data to be written may include: the data collected according to step S120, and/or the buffered data obtained according to steps S115-S135 (e.g., after times of accumulation).

As shown in step S140, the host circuit 10 divides the data to be written into a plurality of groups of block data, which can be regarded as the above step of FIG. 2.

As shown in step S150, the host circuit 10 outputs the plurality of groups of block data to the multi-core storage unit 20 through at least two channels of the plurality of channels individually so as to write the plurality of groups of block data into the multi-core storage unit, which can be regarded as the above step of FIG. 2.

In above step S110, the determination as to whether the portable apparatus is to write data into a plurality of sequential logical blocks can be made according to the data's one or more attribute parameters, such as data format, header of the data source, start of file, end of file and so on. In addition, the determination may be made according to the logical block addresses corresponding to pieces of data occurred in different time (e.g., blocks 1-7 may indicate the logical block addresses of the block data in FIG. 2).

As shown in step S125, the writing criterion is: a memory space of the second buffer memory region of the host circuit 10 for storing the buffered data is full, or the host circuit 10 determines that a time threshold is elapsed (e.g., in the situation where some write operation is time limited).

In an embodiment, the host circuit 10 performs step S140 when the data amount of the data to be written is greater than a data amount threshold (e.g., the data capacity of the first buffer memory region). In another embodiment, the data amount threshold can increase or decrease dynamically, for example, by changing the data amount threshold according to a division criterion, wherein the division criterion may be determined according to the performance and/or other parameters of the portable apparatus 1.

In some embodiments, while the host circuit 10 writes the groups of block data into at least two storage devices, the portable apparatus 1 records corresponding data writing information into a record table accordingly, wherein the data writing information includes: a plurality of corresponding logical block addresses (LBA), corresponding management modules, and a plurality of corresponding physical block addresses (PBA) of the plurality of groups of block data. The record table, for example, is a mapping table maintained by the controller 210 of the multi-core storage unit 20. A piece of the record table can be exemplified by {LBA1, C1, N1, P3}, which indicates that block data of logical block address 1 stores at page 3 of die 1 (e.g., a die of a storage device 221) for the management module 1 (e.g., management module 211). Further, the record table can be stored in the host circuit 10. When the host circuit 10 is to read data in the multi-core storage unit 20, the data to be read can be obtained for use by the host circuit 10, according to the record table.

Further, in the above data access method, chunk size adjustment is performed using steps S110-S120 and/or steps S115-S135 for the sake of the block grouping (or called data flow division) operation of step S140. The upper limit of the data amount for the first buffer memory region (or data to be written) as exemplified can be set to a multiple of the data amount for the logical blocks, e.g., for the sake of the number of channels that the host circuit 10 has or dynamic changes. As such, as illustrated by step S150, the groups of block data can be outputted using multiple channels, leading to the data flow division and thus enhancing the performance.

For the management module (management core) of the controller of the multi-core storage unit 20, the data flow division in the host circuit 10 shares the loading of data flow division by the management module, thus enhancing the access performance. In addition, the host circuit 10 employs a plurality of channels for the sake of data flow division, which can improve overall performance of write and read operation. In this way, the performance of various file access related applications such as the starting of programs, file copying or other related tasks in the portable apparatus can be improved, leading to better usage experience for the users.

Figure 4:
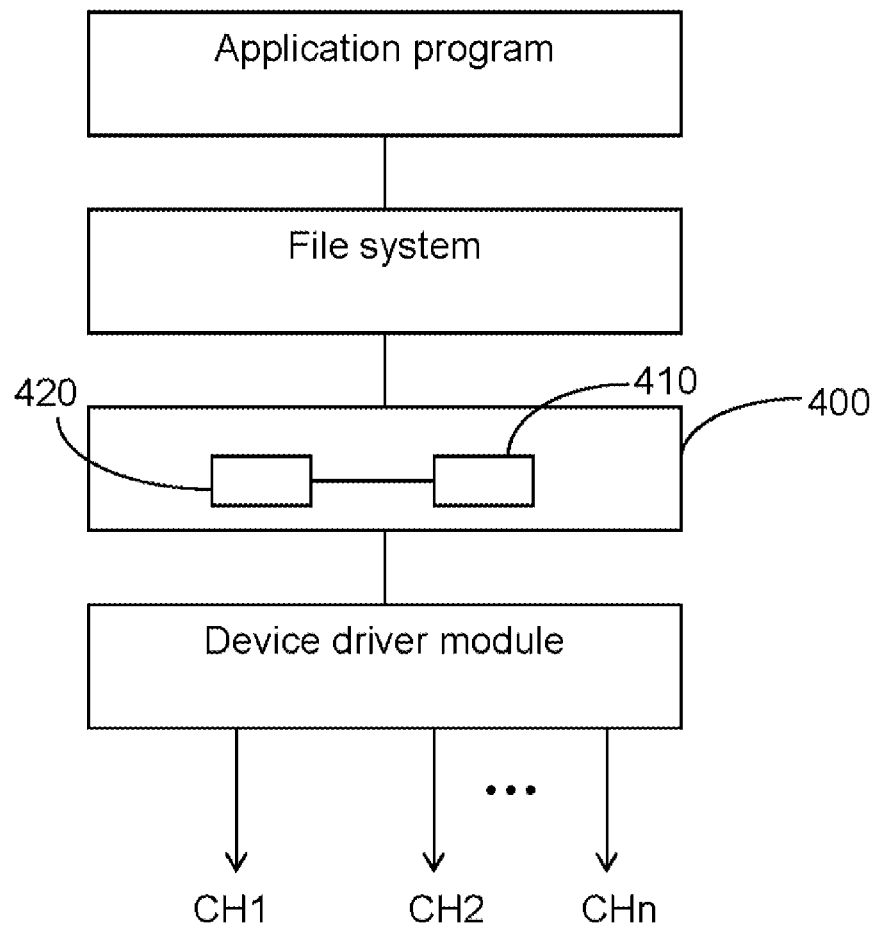
FIG. 4 illustrates another embodiment of the data access method.

FIG. 4 illustrates another embodiment of the data access method. As an example, the host circuit 10 executes an operating system for controlling the portable apparatus 1, and thus each embodiment of the above data access method can be implemented as a framework 400 in the operating system. For instance, a data amount (chunk size) adjustment module 410 (e.g., using the first buffer memory region) for performing the above related steps (such as steps S110-S120 and/or S115-S135) or modified steps thereof, and a block grouping module 420 for performing the related steps (such as step S140) can be implemented. The framework can be realized between the file system and device driver modules of the operating system. In the operating system, the data amount adjustment module 410 determines whether the logical blocks related to the write operation(s) are sequential from the viewpoint of the operating system.

For example, the data amount adjustment module 410 collects or buffers block data in terms of a unit of a block size (such as 512 KB), and transfers the block data to the block grouping module 420 in terms of a unit of a multiple of the block size (such as 1 MB or above). In another embodiment, the block grouping module 420, after grouping operation, can further update the related record in the operating system, such as file allocation table (FAT).

Other embodiments of a computer readable storage medium are further provided, on which program code (such as one or more programs or program modules) is stored. The program code can realize the above data access method. For example, the steps in FIG. 2, 3, or 4 or other embodiment can be implemented as program module(s). When an electronic device (e.g., implemented as the portable apparatus) performs the program code, causing the electronic device to perform the data access method according to the embodiment of FIG. 2, 3, or 4 or other embodiment. The computer readable storage medium in these embodiments includes, without limitation to, an optical information storage medium, a magnetic information storage medium, or memory such as a memory card, firmware, ROM, or RAM, or built-in memory of a programmable microcontroller.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A portable apparatus with using multi-core storage mechanism, comprising:
   a host circuit for controlling the portable apparatus, the host circuit including a plurality of channels to couple a multi-core storage unit to perform a data write or read operation;
   wherein data to be written are divided into a plurality of groups of block data by the host circuit, and the host circuit individually outputs the groups of block data to the multi-core storage unit through at least two channels of the plurality of channels so as to write the plurality of groups of block data into the multi-core storage unit, and when the amount of the data to be written is greater than a threshold amount, the host circuit divides the data to be written into the plurality of groups of block data so as to write the plurality of groups of block data into the multi-core storage unit, and the host circuit determines whether the portable apparatus is to write data into a plurality of sequential logical blocks, and if so, the host circuit collects the data to be written, wherein the data to be written include the collected data.

2. The portable apparatus according to claim 1, wherein the host circuit divides the data to be written into the plurality of groups of block data alternately block-by-block.

3. The portable apparatus according to claim 1, wherein the plurality of groups of block data at least include: a first group of block data and a second group of block data, the at least two channels include: a first channel and a second channel; wherein the host circuit outputs the first group of block data to the multi-core storage unit through the first channel and the host circuit outputs the second group of block data to the multi-core storage unit through the second channel.

4. The portable apparatus according to claim 1, wherein the host circuit determines that the portable apparatus is to write data into non-sequential logical blocks, the host circuit buffers the data; and the host circuit makes the data to be written include the buffered data when a writing criterion is satisfied.

5. The portable apparatus according to claim 4, wherein the writing criterion is: a memory space for storing the buffered data is full, or the host circuit determines that a time threshold is elapsed.

6. The portable apparatus according to claim 1, wherein the host circuit writes the plurality of groups of block data into the at least two storage devices and the portable apparatus records corresponding data writing information into a record table accordingly, wherein the data writing information includes: a plurality of logical block addresses, management modules, and a plurality of physical block addresses corresponding to the plurality of groups of block data.

7. The portable apparatus according to claim 1, wherein the host circuit includes:
   a memory;
   a host data interface unit providing the channels; and
   a processing unit, coupled to the host data interface unit and the memory;
   wherein the processing unit employs the memory to divide the data to be written into the plurality of groups of block data, and the processing unit individually outputs the plurality of groups of block data to the multi-core storage unit through the at least two channels provided by the host data interface unit so as to write the plurality of groups of block data into the at least two storage devices.

8. The portable apparatus according to claim 1, wherein the multi-core storage unit includes:
   a controller, including a plurality of management modules, each of the management modules coupled to a corresponding one of the channels; and
   a plurality of storage devices, each of the storage devices coupled to a corresponding one of the management modules, wherein the controller performs data write or read operation on the storage devices;
   wherein the host circuit writes the plurality of groups of block data into at least two storage devices of the plurality of storage devices.

9. The portable apparatus according to claim 8, wherein the multi-core storage unit further includes:
   a client data interface unit, for being coupled to the channels;
   wherein the controller is coupled to the channels through the client data interface unit, and each of the management modules is coupled to a corresponding one of the channels through the client data interface unit.

10. A data access method, for use in a portable device with a multi-core storage mechanism, the method comprising:
   (a) dividing data to be written into a plurality of groups of block data; and (b) individually outputting the plurality of groups of block data to a multi-core storage unit through at least two channels of the plurality of channels of the portable device so as to write the plurality of groups of block data into the multi-core storage unit;

wherein the step (a) is performed when the amount of the data to be written is greater than a threshold amount, and before the step (a), the method further comprises:

determining whether the portable apparatus is to write data into a plurality of sequential logical blocks; and if so, collecting the data, wherein the data to be written include the collected data.

11. The method according to claim 10, wherein in the step (a), the data to be written are divided into the plurality of groups of block data alternately block-by-block.

12. The method according to claim 10, wherein in the step (b), the plurality of groups of block data at least include: a first group of block data and a second group of block data; the at least two channels include: a first channel and a second channel; wherein the first group of block data are outputted to the multi-core storage unit through the first channel and the second group of block data are outputted to the multi-core storage unit through the second channel.

13. The method according to claim 10, wherein before the step (a), the method further comprises:

if it is determined that the portable apparatus is to write data into non-sequential logical blocks, buffering the data; and if a writing criterion is satisfied, making the data to be written include the buffered data.

14. The method according to claim 13, wherein the writing criterion is: a memory space for storing the buffered data is full, or a time threshold is elapsed.

15. The method according to claim 10, wherein the method further comprises:

recording data writing information into a record table, wherein the data writing information includes: a plurality of logical block addresses, management modules, and a plurality of physical block addresses corresponding to the plurality of groups of block data.

16. A non-transitory computer readable storage medium having stored therein program code of one or more program modules, which when executed by a portable device, causes the portable device to perform the data access method according to claim 10.

* * * * *